US010153874B2

(12) United States Patent
Lorca Hernando

(10) Patent No.: US 10,153,874 B2
(45) Date of Patent: Dec. 11, 2018

(54) METHOD TO PERFORM JOINT SCHEDULING IN THE DOWNLINK OR IN THE UPLINK OF A CENTRALIZED OFDM RADIO ACCESS NETWORK FOR A PLURALITY OF USERS CONSIDERING TIME, FREQUENCY AND SPACE DOMAINS, SCHEDULER DEVICE THEREOF AND COMPUTER PROGRAM PRODUCTS

(71) Applicant: Telefonica, S.A., Madrid (ES)

(72) Inventor: Javier Lorca Hernando, Madrid (ES)

(73) Assignee: Telefonica, S.A., Madrid (ES)

( * ) Notice: Subject to any disclaimer, the term of this patent is extended or adjusted under 35 U.S.C. 154(b) by 44 days.

(21) Appl. No.: 15/334,680

(22) Filed: Oct. 26, 2016

(65) Prior Publication Data
US 2017/0117996 A1 Apr. 27, 2017

(30) Foreign Application Priority Data

Oct. 27, 2015 (EP) .................................... 15382526

(51) Int. Cl.
*H04L 5/00* (2006.01)
*H04W 72/12* (2009.01)
*H04L 5/14* (2006.01)
(52) U.S. Cl.
CPC .......... *H04L 5/0035* (2013.01); *H04L 5/0073* (2013.01); *H04L 5/0075* (2013.01); *H04L 5/0037* (2013.01); *H04L 5/0057* (2013.01); *H04L 5/14* (2013.01); *H04W 72/1231* (2013.01)

(58) Field of Classification Search
CPC ..... H04L 5/0035; H04L 5/0075; H04L 5/003; H04L 5/0037; H04L 5/0073; H04L 5/0057; H04L 5/14; H04W 72/1231
See application file for complete search history.

(56) References Cited

U.S. PATENT DOCUMENTS 8,849,326 B2 * 9/2014 Zangi ................... H04L 1/0001
370/317
9,094,145 B2 * 7/2015 Yue ..................... H04W 72/042
2013/0163539 A1 6/2013 Cao et al.
(Continued)

FOREIGN PATENT DOCUMENTS

EP   2 676 514   12/2013

OTHER PUBLICATIONS

Yuya Saito et al., "Non-Orthogonal Multiple Access (NOMA) for Cellular Future Radio Access", IEEE 77th Vehicular Technology Conference (VTC Spring), Jun. 2, 2013, pp. 1-5.
(Continued)

*Primary Examiner* — Hassan Kizou
*Assistant Examiner* — Hector Reyes
(74) *Attorney, Agent, or Firm* — Sughrue Mion, PLLC

(57) ABSTRACT

Method to perform joint scheduling in the downlink or in the uplink of a centralized OFDM radio access network for a plurality of users considering time, frequency and space domains, scheduler device thereof and computer program products. The method to be applied in the downlink or in the uplink of a centralized radio access network based on OFDM, whereby a set of remote radio heads of a set of remote units are connected to a central unit, that performs all (or part of) the radio-related processing tasks, wherein the scheduling exploit CoMP, NOMA and RF conditions and resource blanking techniques.

21 Claims, 4 Drawing Sheets

(56) References Cited

U.S. PATENT DOCUMENTS

2014/0038623 A1* 2/2014 Davydov .............. H04W 24/02
455/450
2014/0219255 A1 8/2014 Eyuboglu et al.
2015/0146556 A1* 5/2015 Zheng ................... H04B 7/024
370/252

OTHER PUBLICATIONS

Ignacio Berberana et al., "Telefonica 5G vision", 3GPP Draft; RWS-150005 Telefonica 5G Vision, 3rd Generation Partnership Project (3GPP), Mobile Competence Centre; 650, Route Des Lucioles; F-6921, Sophia-Antipolis Cedex; France, Sep. 2, 2015, (11 pages).
Brian Classon e al., "Link Adaptation and Channel Coding", LTE, the UMTS Long Term Evolution: From Theory Practice (2nd edition), 2011, pp. 215-216.
3GPP TS 36.213 "$3^{rd}$ Generation Partnership Project; Technical Specification Group Radio Access Network; Evolved Universal Terrestrial Radio Access (E-UTRA); Physical layer procedures (Release 11)", Jun. 2015, (183 pages).
European Search Report for EP 15 38 2526 dated Mar. 14, 2016.

\* cited by examiner

| RU M-1 | Subband 0 | Subband 1 | ... | Subband n-1 |
|---|---|---|---|---|
| User 0 | $T_{M-1,0,0}$ | $T_{M-1,0,1}$ | ... | $T_{M-1,0,n-1}$ |
|  |  |  |  | $T_{M-1,1,n-1}$ |
|  |  |  |  | ... |
|  |  |  |  | $T_{M-1,N-1,n-1}$ |

| RU 1 | Subband 0 | Subband 1 | ... | Subband n-1 |
|---|---|---|---|---|
| User 0 | $T_{100}$ | $T_{101}$ | ... | $T_{1,0,n-1}$ |
|  |  |  |  | $T_{1,1,n-1}$ |
|  |  |  |  | ... |
|  |  |  |  | $T_{1,N-1,n-1}$ |

| RU 0 | Subband 0 | Subband 1 | ... | Subband n-1 |
|---|---|---|---|---|
| User 0 | $T_{000}$ | $T_{001}$ | ... | $T_{0,0,n-1}$ |
| User 1 | $T_{010}$ | $T_{011}$ | ... | $T_{0,1,n-1}$ |
| ... | ... | ... | ... | ... |
| User N-1 | $T_{0,N-1,0}$ | $T_{0,N-1,1}$ | ... | $T_{0,N-1,n-1}$ |

Fig. 3

METHOD TO PERFORM JOINT SCHEDULING IN THE DOWNLINK OR IN THE UPLINK OF A CENTRALIZED OFDM RADIO ACCESS NETWORK FOR A PLURALITY OF USERS CONSIDERING TIME, FREQUENCY AND SPACE DOMAINS, SCHEDULER DEVICE THEREOF AND COMPUTER PROGRAM PRODUCTS

TECHNICAL FIELD

The present invention is directed, in general, to the field of wireless packet scheduling, and more specifically with scheduling for centralized radio access networks where multiple remote radio heads are connected to a single central unit for baseband processing purposes.

BACKGROUND OF THE INVENTION

Orthogonal Frequency Division Multiplexing (OFDM) is a proven access technique for efficient user and data multiplexing in the frequency domain. One example of a system employing OFDM is Long-Term Evolution (LTE). LTE is the next step in cellular Third-Generation (3G) systems, which represents basically an evolution of previous mobile communications standards such as Universal Mobile Telecommunication System (UMTS) and Global System for Mobile Communications (GSM). It is a Third Generation Partnership Project (3GPP) standard that provides throughputs up to 50 Mbps in uplink and up to 100 Mbps in downlink. It uses scalable bandwidth from 1.4 to 20 MHz in order to suit the needs of network operators that have different bandwidth allocations. LTE is also expected to improve spectral efficiency in networks, allowing carriers to provide more data and voice services over a given bandwidth. Other wireless standards like WiFi (IEEE 802.11) or WiMAX (IEEE 802.16) also employ OFDM.

In LTE there are several mechanisms by which the terminals inform the Base Station or eNodeB about the radio conditions they are experiencing [1]. The quantity which is defined to measure the instantaneous quality is called Channel Quality Indicator (CQI), and represents a measure of the most suitable Modulation and Coding Scheme (MCS) to be used for a 10% probability of erroneous reception without retransmissions. The parameters CQI may refer to the whole bandwidth or be expressed as a set of values, each corresponding to different frequency subbands. The subbands are comprised of a predetermined number of subcarriers depending on the system bandwidth and the mode of operation. A Frequency Selective Scheduler (FSS) should take advantage of these quantities, which are reported by the User Equipment's (UES) to the eNodeB, in order to assign the available resources so as to maximize the cell capacity and the throughput perceived by each user. Since different mobile terminals will in general observe different frequency-dependent fading profiles, channel-dependent scheduling tends to allocate portions of the overall available bandwidth in a more efficient manner than any arbitrary allocation of bandwidth chunks.

One emerging trend in the field of cellular network architectures is so-called Cloud RAN or Centralized RAN (CRAN). CRAN deployments perform all radio-related procedures of multiple cells at a single central unit, leaving the radio frequency (RF) transmission and reception tasks to the remote radio heads (RRHs). Apart from the cost advantages that can be obtained from hardware centralization (such as reduced operational and maintenance costs), there are additional benefits from centralization of the processing tasks as a result of avoiding inter-cell information exchange. As an example, coordinated scheduling in CRAN has the ability to avoid interferences by simultaneously allocating resources at multiple cells, in such a way that minimal inter-cell interference can be sought. Another example comes from the application of Coordinated Multi-Point (CoMP) techniques, which envisage the transmission/reception at multiple sites in order to reduce interferences and increase cell-edge throughput and overall network capacity. Both techniques require the proper exchange of signaling information and/or data between nodes that will obviously be avoided in CRAN.

Although it is generally perceived that CRAN can bring a lot of new possibilities for RAN deployments, some approaches only aggregate the processing tasks of many sites, thus facilitating inter-cell coordination and resource pooling but not fully exploiting centralized operation. The advantages brought by CRAN can only be exploited if proper scheduling techniques are envisaged. Scheduling should take into account not only the channel characteristics of the users in each of the cells, but also the mutual interferences with other cells so as to maximize the overall capacity. In this scenario, the classical approach of assigning different cell identifiers to each of the cells may not be appropriate, as many cells would eventually have to listen to users' quality reports irrespective of whether they are connected to them or not. Therefore, an alternative approach based on assigning the same cell identity to all the cells may be more effective, as in US patent application US-A1-20140219255. This "super cell" concept ideally avoids handovers and allows the reuse of network resources when there is enough RE isolation between users and sites, thereby increasing capacity without partitioning the network into cells. In addition, even in conditions of significant mutual interference between adjacent users and sites, several COMP-based techniques can be exploited for increased capacity.

The usual approach of aggregating resources in CRAN dismisses new opportunities for more flexible network deployments. Some solutions rely on having the same network topology as distributed RAN has, with different cell identifiers for each of the different sites.

The main drawback of this approach is that users still have to rely on handovers under mobility conditions. A more serious drawback is the lack of flexibility in assigning resources to different sites, being the performance ultimately impaired by interference as well as by the ability of devices to feedback the relevant channel state information in CoMP, which suffers from inherent limitations.

There are initiatives like the one proposed in US-A1-20140219255 where the remote radio heads can be flexibly associated with the same or different cell identities, thereby changing the network configuration in accordance with the central processing unit. However no details are provided in regard to how resources can be efficiently scheduled in the combined space-time-frequency resource grid. The solution provided by US patent application US-A1-20130163539 generalizes the Proportional Fair criterion to a distributed multi-node communications system, however it does not give any actual details on what criteria should be followed in order to perform the nodes association so as to benefit from the coordination capabilities (like CoMP).

More efficient ways to deal with resources scheduling and inter-cell interference are therefore needed in centralized RAN deployments, which motivates the present invention.

REFERENCES

[1] S. Sesia, I. Toufik, M. Baker (editors), "LTE, the UMTS Long Term Evolution: From Theory to Practice" (2nd edition), John Wiley & Sons, 2011, p. 215
[2] Y. Saito et al, "Non-Orthogonal Multiple Access (NOMA) for Cellular Future Radio Access", IEEE 77th Vehicular Technology Conference (VTC Spring), 2013
[3] 3GPP TS 36.213 "Evolved Universal Terrestrial Radio Access (E-UTRA); Physical layer procedures (Release 11)"

DESCRIPTION OF THE INVENTION

It is accordingly an object of the present invention to provide a scheduling technique (sub-optimal) to be applied in centralized radio access networks (CRAN) based on OFDM, whereby a set of remote radio heads of a set of remote units are connected to a central processing unit, or central unit, that performs all (or part of) the radio-related processing tasks. The proposed technique is not optimal (as an optimal solution to this problem would be NP-hard, i.e. non-computable in polynomic time), and a sub-optimal approach is provided based on the proposal disclosed in EP-A1-2676514, of the same inventors of this invention, by extending said proposal to a centralized scenario and further applying specific radio resource management techniques for increased capacity.

According to the invention, the term remote unit or RU, as will be termed from now on, will denote each of the sites with one or more antennas connected to the central unit or CU as will be also termed from now on. Also, and without loss of generality, the CU will centralize all the radio-related processing tasks, or some of them, and the RUs will in turn execute the remaining processing tasks.

To that end, according to one aspect, the proposed method, for the downlink of said CRAN such as a LTE network, comprises:
a) initializing values user(i, k)=−1 for all values of and k, and $S_i = \{\emptyset\}$, wherein user(i, 0), user(i, 1), . . . , user(i, n−1) denote the set of users which will be assigned subbands 0, 1, . . . , n−1 at a RU i, and $S_i$ denotes the set of users that have already been scheduled a total of K subbands at arbitrary frequency locations for said RU i according to the expression:

$S_i = \{j \in [0, N-1]: j = \text{user}(i, k_0), \ldots, j = \text{user}(i, k_{K-1}) \text{ for } k_0, k_1 \ldots, k_{K-1} \in [0, n-1]\}$;

b) calculating scheduling metrics $T_{ijk}$ corresponding to RU i, user j and subband k according to a given criterion, and constructing a three-dimensional metrics table of size N×n×M (being N the number of users of the radio access network and M the number of RUs) containing said scheduling metrics;
c) storing channel quality indicators, $CQI_{ijk}$ associated to RU i, user j and subband k, said channel quality indicators representing a measure of the channel quality as perceived by the users;
d) selecting, for each time instant, a random subband k and RU i among a set of subbands and RUs not yet assigned by the method:
e) finding a user $j_0$ with the highest metric $T_{ijk}$ for RU i and subband k among the users not belonging to $S_i$ according to the expression:

$$j_0 = \underset{j \notin S_i}{\text{argmax}}\{T_{ijk}\},$$

wherein if several maxima are found, the user $j_0$ is chosen randomly among a number of users $j_0$ fulfilling said maxima;
f) analyzing whether there is another RU i' for which user $j_0$ has a higher maximum value of the metric $T_{ijk}$ for the same subband k, and in that case then considering RU i' rather than RU i for association with user $j_0$, otherwise considering RU i;
g) checking, for the selected RU i, whether there is another user $j_0$' already scheduled in the same subband as $j_0$, and in the affirmative case:
  g1) deciding whether CoMP can be employed in that subband, and if CoMP can be employed, and if the number of already coordinated users is lower than L, then automatically scheduling for user $j_0$ the same set of subbands scheduled for user $j_0$', wherein L denotes the size of the CoMP cluster; or
  g2) crossing out all the metric values for user $j_0$ and the RUs involved in the coordination in the three-dimensional metrics table, for the set of subbands scheduled for user $j_0$', and if the number of already coordinated users is equal to L then all metric values will be crossed out for all the remaining users at the same set of subbands and RUs involved in the coordination;
h) if there is no other user $j_0$' already scheduled in the same subband as $j_0$ for the selected RU, analyzing whether there is another subband $l \neq k$ for which user $j_0$ has a higher maximum value of the metric $T_{ijk}$, and
  in the affirmative case, secondary maxima of the metric values are sought for both subbands, namely:

$$j_1 = \underset{j \notin S_i, j \neq j_0}{\text{argmax}}\{T_{ijk}\}$$

$$j_2 = \underset{j \notin S_i, j \neq j_0}{\text{argmax}}\{T_{ijl}\},$$

and if $T_{ij_1k} + T_{ij_0l} > T_{ij_0k} + T_{ij_2l}$ then assigning user $j_1$ to subband k and user $j_0$ to subband l, otherwise assigning user $j_0$ to subband k and user $j_2$ to subband l;
  if there is no other subband $l \neq k$ for which user $j_0$ has a higher maximum value of the metric $T_{ijk}$, assigning user $j_0$ to subband k;
i) analyzing whether the assigned subband(s) can also be scheduled at a different RU i' in CoMP, Non-Orthogonal Multiple Access (NOMA) or Radio Frequency (RF) isolation conditions, by:
  i1) deciding whether CoMP can be employed for a given RU i'≠i, and in such a case and if the number of already coordinated RUs for user j is lower than L, then applying CoMP techniques so that the same user and subbands will be scheduled at RUs i and i';
  i2) deciding whether NOMA can be employed for a given RU i'≠i, and in such a case then applying NOMA for RUs i and i' and users j and j' at subband k, thereby sharing resources for both users at both RUs, and crossing out and any other entries in the three-dimensional table corresponding to RUs i and i' for subband k and users other than j and j';
  i3) deciding whether there is sufficient RF isolation between RUs i and i' for subband k and a given RU i', and in such a case then RUs i and i' will be considered sufficiently isolated for user j, and subband k can be reused for those RUs; and i4) crossing out any entries in the three-dimensional metrics table corresponding to RUs for which the above three conditions (i1-i3) are not met at the assigned subband k for user j, thereby muting transmissions from interfering RUs for all users j at resources wherein interference is significant and cannot be mitigated;

j) checking whether any user has already been scheduled the maximum number of subbands K for a given RU i, and in such a case:

j1) crossing out the corresponding values $T_{ijk}$ in the three-dimensional metrics table for RU i and user j∀k, j2) adding user j to the set $S_i=S_i \cup \{j\}$, and j3) if the user is in CoMP then all other users simultaneously scheduled by the involved RUs will also be included in the set, and the corresponding values $T_{ijk}$ be crossed out ∀k; and k) repeating steps d) to j) by selecting a new random subband and RU until there are no subbands left unassigned in any of the RUs, after updating the three-dimensional metrics table with the values corresponding to a next time instant and setting $CQI_{ijk}$ values to minus infinity for all users at those RUs and subbands wherein resource blanking was applied.

According to an embodiment, in step f), in order to analyze whether there is another RU i' for which said user $j_0$ has a higher maximum value of said metric $T_{ijk}$ for the same subband k, the method checks if there exists an i'≠i that fulfills the following expressions:

$$user(i', k) = -1;$$

$$T_{i'j_0k} > T_{ij_0k}; \text{ and}$$

$$j_0 = \underset{j \notin S_{i'}}{\operatorname{argmax}} \{T_{i'jk}\}.$$

According to another embodiment, in step g1), in order to analyze whether CoMP can be employed in a subband wherein there is another user $j_0$' already scheduled in the same subband as said user $j_0$, the method checks if $|CQI_{i'j0}-CQI_{ij0}|<Threshold_{CoMP}$ at the set of RUs i' being coordinated for user $j_0$' wherein $CQI_{ij}$ is the wideband CQI for user j and RU i, and $Threshold_{CoMP}$ is a pre-configured parameter.

According to another embodiment, in step h), in order to analyze whether there is another subband l≠k for which said user $j_0$ has a higher maximum value of said metric $T_{ijk}$, the following conditions are checked:

$$user(i, l) = -1;$$

$$T_{ij_0l} > T_{ij_0k}; \text{ and}$$

$$j_0 = \underset{j \notin S_i}{\operatorname{argmax}} \{T_{ijl}\}.$$

According to another embodiment, in step i1), in order to analyze whether CoMP can be employed at a different RU i' for said assigned subband(s), the method checks if $|CQI_{i'j}-CQI_{ij}|<Threshold_{CoMP}$ for a given RU i'≠i, wherein $CQI_{ij}$ denotes the wideband CQI for user j and RU i and $Threshold_{CoMP}$ is a pre-configured parameter.

According to another embodiment, in step i2), in order to analyze whether NOMA can be employed at a different RU i'≠i for said subband k, the method checks if $Threshold_{RFisolation}<|CQI_{i'jk}-CQI_{ijk}|<Threshold_{NOMA}$ for a given RU i' and if there exists another user j' for which $Threshold_{RFisolation}<|CQI_{ij'k}-CQI_{i'j'k}|<Threshold_{NOMA}$, wherein $Threshold_{RFisolation}$ and $Threshold_{NOMA}$ are pre-configured parameters.

According to yet another embodiment, in step i3), in order to analyze whether there is sufficient RF isolation between RUs i and i' for said subband k the method checks if $|CQI_{i'jk}-CQI_{ijk}|<Threshold_{RFisolation}$, wherein $Threshold_{RFisolation}$ is a pre-configured parameter.

According to another aspect, the proposed method, for the uplink of said CRAN, comprises:

a) initializing values user(i, k)=−1 for all values of i and k, and $S_i=\{\emptyset\}$, wherein user(i, 0), user(i, 1), . . . , user(i, n−1) denote the set of users which will be assigned subbands 0, 1, . . . , n−1 at RU i, and $S_i$ denotes the set of users that have already been scheduled a total of $K_0$ subbands at RU i, wherein $K_0 \leq K$, according to the expression:

$$S_i=\{j \in [0,N-1]; j=user(i,k_0), \ldots, j=user(i,k_0+K_0-1) \text{ for } K_0 \leq K, k_0 \in [0,n-1]\};$$

b) calculating scheduling metrics $T_{ijk}$ corresponding to RU i, user j and subband k according to a given criterion, and constructing a three-dimensional metrics table of size N×n×M containing said scheduling metrics;

c) storing channel quality indicators, $CQI_{ijk}$ associated to RU i, user j and subband k, said channel quality indicators representing a measure of the channel quality as perceived by the CU;

d) selecting, for each time instant, a random subband k and RU i among a set of subbands and RUs not yet assigned by the method:

e) finding a user $j_0$ with the highest sum of adjacent metrics $T_{ijk}$ for RU i counting from k, among the users not belonging to $S_i$, according to the expression:

$$j_0 = \underset{j \notin S_i}{\operatorname{argmax}}\{sum^*(i, j, k, K_k), \text{ for some } K_k \leq K\},$$

wherein if several maxima are found, the user $j_0$ is chosen randomly among a number of users $j_0$ fulfilling said maxima, and $sum^*(i, j, k, K_k)$ represents the sum of the metrics at RU i and user j in a number $K_k$ of adjacent subbands starting from subband k:

$$sum^*(i,j,k,K_k) \equiv T_{ijk}+T_{ij,k+1}+ \ldots +T_{ij,k+K_k-1};$$

f) analyzing whether there is another RU i' for which user $j_0$ has a higher maximum value of the sum of the metrics, and in such a case then considering RU i' rather than RU i for user $j_0$, otherwise considering RU i', g) analyzing, for the selected RU i, whether there is another subband l≠k for which user $j_0$ has a higher maximum value of the sum of the metrics, and in the affirmative case then secondary maxima of the sum of the metrics are sought for both sets of subbands, namely:

$$j_1 = \underset{j \notin S_i, j \neq j_0}{\operatorname{argmax}}\{sum^*(i, j, k, K_{k1}), \text{ for some } K_{k1} \leq K\}$$

$$j_2 = \underset{j \notin S_i, j \neq j_0}{\operatorname{argmax}}\{sum^*(i, j, k, K_{l2}), \text{ for some } K_{l2} \leq K\},$$

and if the following condition is fulfilled:

$$\text{sum}^*(i,j_1,k,K_{k1}) + \text{sum}^*(i,j_0,l,K_l) > \text{sum}^*(i,j_0,k,K_k) + \text{sum}^*(i,j_2,l,K_{l2})$$

then assigning user $j_1$ to subbands k, k+1, ..., k+$K_{k1}$−1 and user $j_0$ to subbands l, l+1, ..., l+$K_l$−1, otherwise assigning user $j_0$ to subbands k, k+1, ..., k+$K_k$−1 and user $j_2$ to subbands l, l+1, ..., l+$K_{l2}$−1;
if there is no other subband l≠k for which user $j_0$ has a higher maximum value of the sum of the metrics, assigning $j_0$ to subbands k, k+1, ..., k+$K_k$−1;
h) analyzing whether the assigned subband(s) can also be scheduled at a different RU i'≠i in CoMP, NOMA or RF isolation conditions, by:
  h1) deciding whether CoMP can be employed, and in such a case and if the number of already coordinated RUs for user j is lower than L then applying CoMP techniques and scheduling the same subbands at RUs i and i', and crossing out the metric values $T_{ijk}$ for RUs i, i' and subbands k corresponding to users other than j;
  h2) deciding whether NOMA can be employed for a given RU i'≠i and in such a case then applying NOMA for RUs i and i' and users j and j' at the scheduled subbands, thereby sharing resources for both users at both RUs, and crossing out and any other entries in the three-dimensional table corresponding to RUs i and i' for the assigned subbands and for users other than j and j';
  h3) deciding whether there is sufficient RF isolation between RUs i and i' for a given RU i' and the assigned set of subbands, and in such a case then RUs i and i' will be considered sufficiently isolated for user j, and the assigned subbands can be reused for those RUs; and
  h4) crossing out any entries in the three-dimensional metrics table corresponding to RUs for which the above three conditions (h1-h3) are not met at the assigned subbands for user j, thereby muting transmissions from interfering RUs for all users j at resources wherein interference is significant and cannot be mitigated;
i) checking whether any user has already been scheduled the maximum number of subbands K for a given RU i, or if no more subbands can be scheduled to a given user in RU i, and in such a case:
  i1) crossing out the corresponding values $T_{ijk}$ in the three-dimensional metrics table for RU i and user j∀k, and
  i2) adding user j to the set $S_i = S_i \cup \{j\}$; and
j) repeating steps d) to i) by selecting anew random subband and RU until there are no subbands left unassigned in any of the RUs, after updating the three-dimensional metrics table with the values corresponding to a next time instant and setting $CQI_{ijk}$ values to minus infinity for all users at those RUs and subbands wherein resource blanking was applied.

According to an embodiment, in step f), for the uplink of said CRAN, in order to analyze whether there is another RU i' for which said user $j_0$ has a higher maximum value of said sum of the metrics, the method checks the following expressions:

$$\text{user}(i', k) = -1;$$

$$\text{sum}^*(i', j_0, k, K'_k) > \text{sum}^*(i, j_0, k, K_k) \text{ for some } K'_k \le K; \text{ and}$$

$$j_0 = \underset{j \notin S_{i'}}{\text{argmax}} \{\text{sum}^*(i', j, k, K'_k), \text{ for some } K'_k \le K\}.$$

According to an embodiment, in step g), for the uplink of said CRAN, in order to analyze whether there is another subband l≠k for which said user $j_0$ has a higher maximum value of said sum of the metrics, the method checks the following conditions:

$$\text{user}(i, l) = -1,$$

$$\text{user}(i, l+1) = -1, \ldots, \text{user}(i, l+K_i-1) = -1 \text{ for some } K_l \le K;$$

$$\text{sum}^*(i, j_0, k, K_l) > \text{sum}^*(i, j_0, k, K_k); \text{ and}$$

$$j_0 = \underset{j \notin S_i}{\text{argmax}} \{\text{sum}^*(i, j, l, K_l)\}.$$

According to an embodiment, in step h1), for the uplink of said CRAN, in order to analyze whether CoMP can be employed at a different RU i' for said assigned subbands, the method checks if $|CQI_{i'j} - CQI_{ij}| < \text{Threshold}_{CoMP}$ for a given RU i'≠i, wherein $CQI_{ij}$ denotes the wideband CQI for user j and RU i and $\text{Threshold}_{CoMP}$ is a pre-configured parameter.

According to an embodiment, in step h2), for the uplink of said CRAN, in order to analyze whether NOMA can be employed at a different RU for said assigned subbands, the method checks if $\text{Threshold}_{RFisolation} < |CQI_{i'jk} - CQI_{ijk}| < \text{Threshold}_{NOMA}$ for a given RU i'≠i and if there exists another user j' for which $\text{Threshold}_{RFisolation} < |CQI_{ij'k} - CQI_{i'j'k}| < \text{Threshold}_{NOMA}$, wherein $\text{Threshold}_{RFisolation}$ and $\text{Threshold}_{NOMA}$ are pre-configured parameters.

According to an embodiment, in step h3), for the uplink of said CRAN, in order to analyze whether there is sufficient RF isolation between RUs i and i' for a given RU i'≠i and the assigned set of subbands, the method checks if $|CQI_{i'jk} - CQI_{ijk}| < \text{Threshold}_{RFisolation}$ wherein $\text{Threshold}_{RFisolation}$ is a pre-configured parameter.

The scheduling metrics for RU i, user j and subband k in the proposed method (either for the downlink or for the uplink) are derived according to a Proportional Fair criterion by means of the expression:

$$T_{ijk} = \frac{\text{throughput at } RU \ i \ \text{for user } j \ \text{in subband } k}{\text{average past throughput of user } j} = \frac{R_{ijk}}{\langle R_j \rangle},$$

where: $T_{ijk}$ are the scheduling metrics, $R_{ijk}$ are the throughput values, and $\langle R_j \rangle$ is the average past throughput of user j.

In an embodiment, the throughput values $R_{ijk}$ can be obtained from the channel quality indications $CQI_{ijk}$ provided that each CQI value corresponds to a particular block size for which the instantaneous throughput can be calculated. Also, the average past throughput values of user j, $\langle R_j \rangle$, can be obtained by applying an autoregressive filter over the past throughput values that smooths out their variations, or by direct averaging of said past throughput values.

In addition, NOMA techniques can be used with a constant transmit power at the involved RUs or users and/or with a variable transmit power according to a power control strategy devised to maximize capacity.

Besides, a Sum rate capacity of the number M of RUs can be calculated by summing all the throughput values of the users, after applying an improvement factor to the users in CoMP with respect to the throughput obtained without CoMP if a single serving RU was used and not considering RUs other than said single serving RU, said improvement factor accounting for the a-priori beneficial effects of CoMP.

In an embodiment, said ThresholdCoMP, ThresholdRFisolation and ThresholdNOMA parameters are dynamically configured according to the scenario in use.

In an embodiment, the sum-rate capacity of the number M of RUs is calculated by summing all the throughput values of the users, after applying an improvement factor to the users in NOMA that accounts for the interference cancellation benefits at a receiver.

In the proposed method, the channel quality in downlink direction can be reported by the users by means of channel quality indicators, and can be estimated by the CU in uplink direction, in Frequency Division Duplex, FDD, mode. Alternatively, the channel quality in downlink and uplink directions can be estimated by the CU, in Time Division Duplex, TDD, mode.

The set of channel quality indicator (CQI values) can be extended to incorporate additional values with associated effective signal to interference and noise ratios which are lower than the one corresponding to the smallest coding rate allowable in the number M of RUs, said extended channel quality indicators characterizing varying amounts of interference in order to evaluate the application of NOMA and RF isolation techniques.

Other embodiments of the invention, according to other aspects, that are disclosed herein also include a scheduler device, preferably arranged and/or implemented in a base station or eNodeB, and software programs to perform the method embodiment steps and operations summarized above and disclosed in detail below. More particularly, a computer program product is one embodiment that has a computer-readable medium including computer program instructions encoded thereon that when executed on at least one processor in a computer element causes the processor to perform the operations indicated herein as embodiments of the invention.

Therefore, present invention specifies a scheduling algorithm (sub-optimal) for CRAN deployments that aims at jointly allocating the best possible resources in time, frequency and space dimensions. In contrast with the solution proposed in EP-A1-2676514, where scheduling needs to be performed independently for every sector in the scenario, present invention jointly allocates resources for a CRAN deployment thus yielding the best possible allocation of resources, under the limitations of the sub-optimality of the algorithm.

By adopting a single-cell strategy it is possible to avoid extra signaling from handovers, while at the same time facilitating specialized radio resource management techniques like NOMA and CoMP. By taking into account these techniques it is possible to overcome inter-cell interference and increase capacity. Moreover, resource blanking (in conditions of unavoidable interference) and reuse of resources (in conditions of sufficient RF isolation) can help mitigating inter-cell interference that would otherwise be present in uncoordinated distributed deployments.

The complexity of the proposed algorithm is linear with the number of RUs, subbands and users, thereby yielding tractable complexity in realistic deployments with large numbers of users and RUs. Application of CoMP, which can include joint transmission or joint reception, and NOMA techniques rely on additional conditions that must be checked on a case-by-case basis, but basic requirements for the observed channel quality values are given as necessary conditions for the pairing of users to RUs.

The algorithm can operate either in adjacency or non-adjacency conditions for the allocated subbands. The adjacency requirement imposes an additional constraint that is taken into account in the scheduling process, thereby making it possible to operate in both the uplink and downlink of LTE systems.

BRIEF DESCRIPTION OF THE DRAWINGS

The previous and other advantages and features will be more fully understood from the following detailed description of embodiments, with reference to the attached figures, which must be considered in an illustrative and non-limiting manner, in which:

FIG. 3 is an example of a three-dimensional metrics table containing the scheduling metrics for the different remote units.

DETAILED DESCRIPTION OF THE INVENTION

Figure 1:
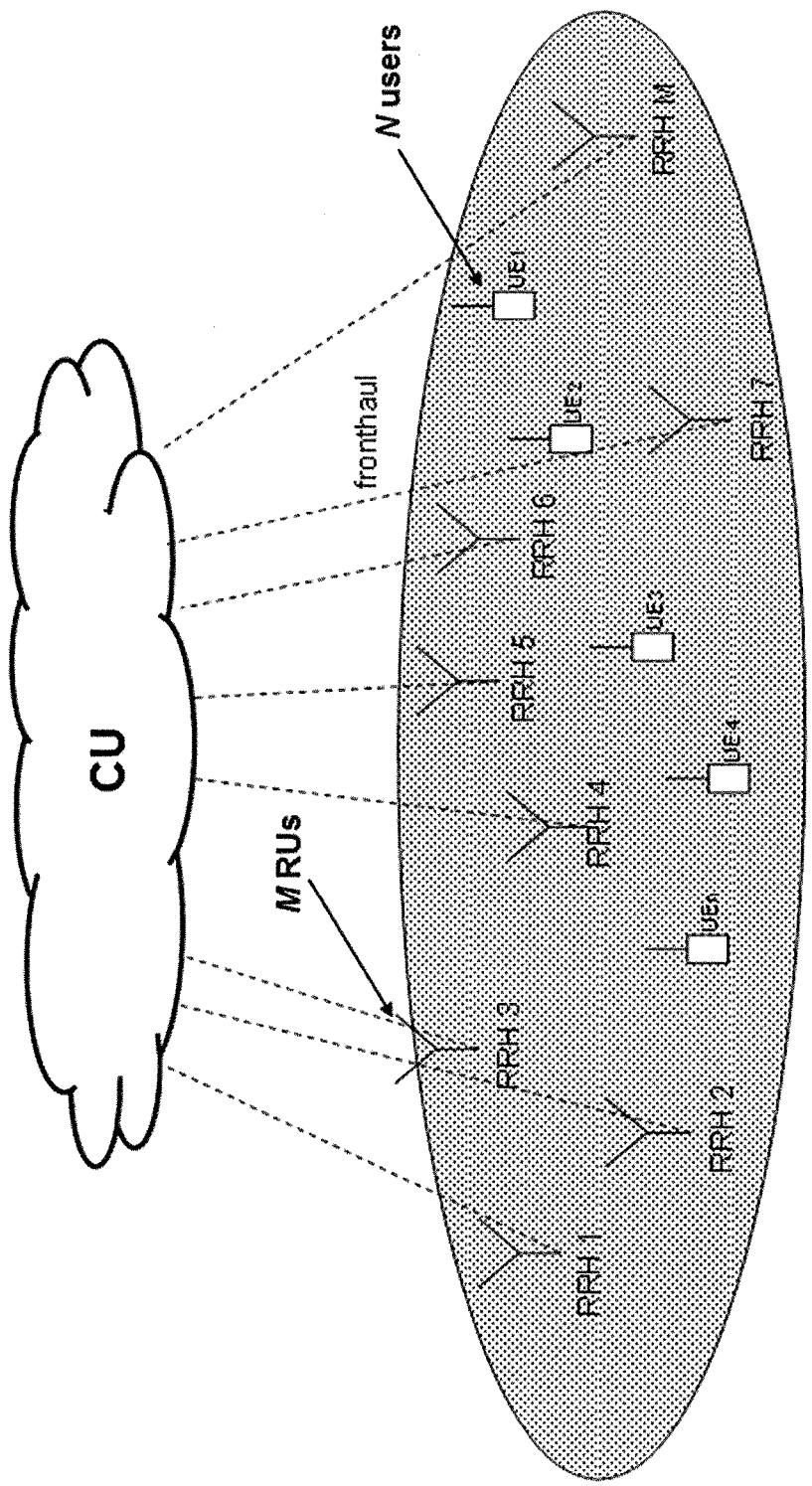
FIG. 1 illustrates a simplified scenario of a centralized radio access network.

FIG. 1 shows a simplified scenario for application of the proposed invention, where a CRAN, belonging to a cellular network such as a LTE network comprises multiple M RUs each of them having one or more antennas connected to one baseband central processing unit, central unit or CU (or data center), which performs all (or part of) the radio-related processing tasks. The links connecting the RUs with the CU, commonly known as fronthaul, carry the baseband signals corresponding to each of the transmit and receive antennas with minimal latency. A number N of users want to have access to the cellular network through connection to the RUs, and the objective is to design a scheduling mechanism in the time-space-frequency domain maximizing the capacity of the whole scenario.

Although CRAN deployments traditionally centralize all the radio-related processing of the cells under study (i.e. the physical layer and above in the radio protocol stack), there are alternatives where radio processing is split at some point (usually at the physical layer or the Medium Access Control, MAC layer) and tasks below that point run at the RRHs of the RUs, while the rest of the processing is still centralized. This invention can also be applied to these situations without loss of generality provided that the scheduler runs in a centralized way.

Rather than relying on different cell identifiers, present invention assumes that all the RUs belonging to a CRAN deployment have the same cell identifier, i.e. they act as a single "super cell" comprising multiple distributed antennas. Given that most part (if not all) of the radio resource management is centralized, there is no need to split resources into different cells as in standard distributed deployments. Having a single cell allows the network to get rid of handovers inside the domain of the CRAN, and facilitates CoMP techniques by transforming them into intra-cell Multiple-Input Multiple-Output (MIMO) techniques. However this assumes that there exists an appropriate signaling procedure to differentiate the RUs as seen by a user, based on suitable pilot sequences or other similar ways, so that users can identify the signals from the different RUs even under the same cell identifier. This may require e.g. changing the reference signals definition in LTE for channel estimation purposes, but this will not be addressed by the present invention.

The proposed scheduling procedure takes advantage of the following techniques when assigning space-frequency resources:

Resources will be reused between RUs having sufficient radio frequency isolation, thereby avoiding interference and simplifying device operation. The single cell functionality avoids any handovers thanks to the similarity in cell identity.

At those locations and frequencies where strong interference is received at/from different RUs, CoMP techniques may be applied so as to increase the throughput at the boundaries between RUs. CoMP techniques are not always applicable as they depend on the channel characteristics and the available feedback from users, therefore actual implementations should always check the feasibility of doing CoMP on a case by case basis.

Points where interference is not as strong as above, but still harmful, can employ so-called Non-Orthogonal Multiple Access (NOMA) [2]. NOMA exploits the difference in the received powers between a desired and an interfering signal to correctly demodulate the former through Successive Interference Cancellation (SIC) techniques, even at the same frequency resources. NOMA is especially suited to those cases where one signal dominates the overall received power. Simple signaling is required by the CU to assist devices in performing interference cancellation. For simplicity only constant transmit power will be considered at the users or RUs involved.

Users for which none of the above can be applied will be scheduled different frequencies and/or time instants so as to minimize interferences between RUs, thereby requiring selective resource blanking for interference avoidance.

The proposed method is designed to combine the above techniques so as to minimize interferences and maximize the overall capacity, under the limitations imposed by the chosen strategy, in order to keep the overall complexity still tractable with high numbers of RUs, subbands and users.

Each of the RUs may have more than one antenna. However (and for simplicity) no single user MIMO (SU-MIMO) will be considered, i.e. the RUs will be assumed to have a single antenna and any additional antennas will be operated in diversity mode. It will be apparent for those skilled in the art that extension to SU-MIMO of the procedures described in this invention would be straightforward.

It is to note that there are several implementations of CoMP, but in the present invention only those dealing with joint transmission and joint reception at the data plane will be considered. In joint transmission multiple transmitters are coordinated so as to simultaneously serve one or more users (in the downlink). In joint reception multiple receivers are coordinated to simultaneously receive the signals from a given user (in the uplink). In the downlink the set of coordinated transmitters may simultaneously serve several users at the same frequency resources (with the aid of suitable precoding strategies), but in the uplink users cannot collaborate and coordination is only aimed at reinforcing the signal from a single user. This point will also be taken into account in the invention.

The proposed method covers the cases where adjacency of the scheduled frequency resources is required (as in LTE uplink) or not required (as in LTE downlink).

The proposed invention is based on the time-frequency scheduling mechanism proposed in EP-A1-2676514. It focuses on the scheduling of resources in a single cell, extending its applicability to multiple cells in a centralized deployment by exploiting RF isolation, non-orthogonal multiple access, resource blanking, and CoMP techniques on the data plane.

Figure 2:
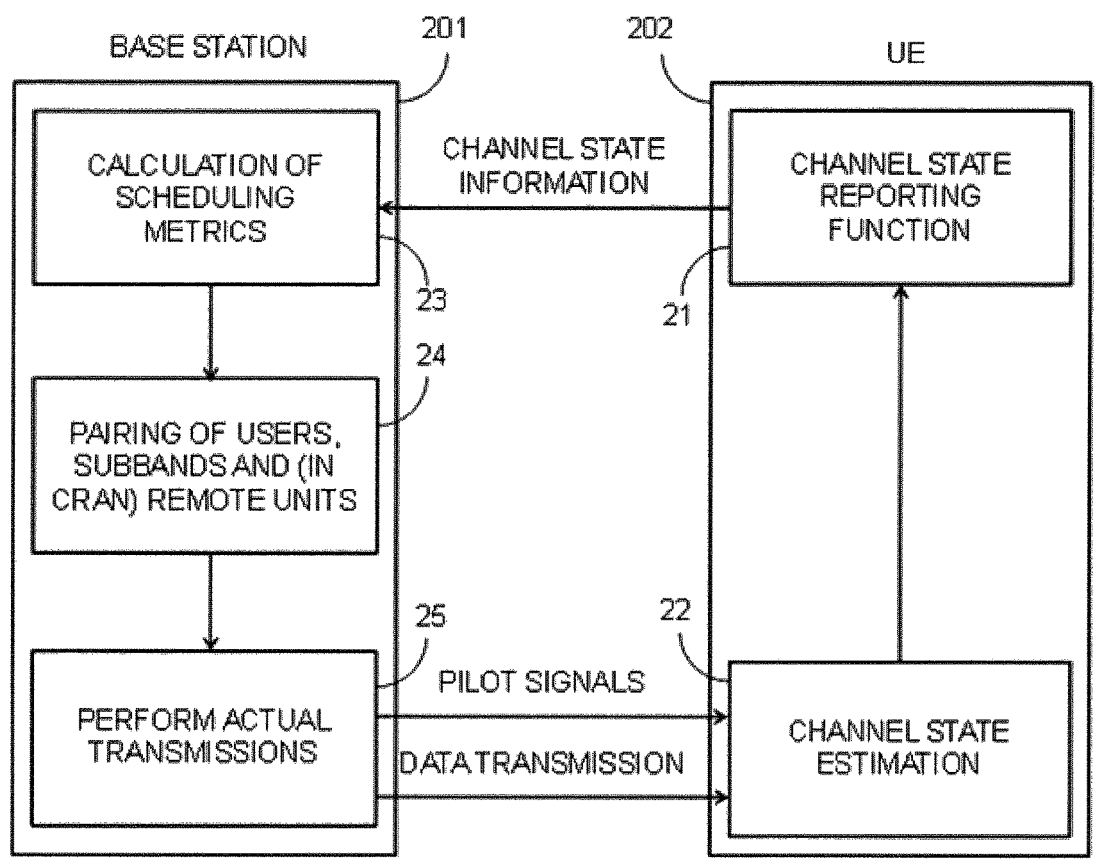
FIG. 2 is a schematic illustration of the proposed scheduling process in the downlink of wireless cellular networks.

With reference now to FIG. 2, therein it is illustrated the basic behavior of the proposed scheduling mechanism in the downlink of a wireless cellular network (whether centralized or not). Users (UES) 202 periodically sense the medium for acquiring appropriate downlink channel state information (CSI) 22, and report suitable indications to the network through a reverse channel 21 when uplink frequencies are different than downlink frequencies (as in FDD, where no channel reciprocity can be assumed). TDD deployments enjoying channel reciprocity can rely on direct channel sensing at a base station thus getting rid of CSI reports. OFDM has the ability to perform frequency-selective radio resource management techniques, therefore CSI reports can be made frequency-dependent for different frequency regions of interest according to several operational modes [1]. With the aid of these CSI reports, a scheduler device/unit at a base station 201 first calculates the scheduling metrics 23 and then performs the optimal pairing of users, subbands and (in the case of CRAN) RUs 24, so as to maximize the overall capacity and keep the users satisfied irrespective of their actual radio conditions (under a certain degree of fairness). Actual transmissions 25 comprise both regular data and pilot transmissions, from which users can perform suitable channel estimation 22. Resource allocation in CRAN introduces an additional degree of freedom in the association of users to RUs compared to distributed deployments, and the problem can be expressed as the optimal pairing of users, subbands and RUs that maximizes capacity under specific constraints.

Scheduling for the uplink direction is equivalent to that in FIG. 2, with the advantage that no channel state reporting function will be needed and the base station 201 can estimate the channel through straightforward examination of the uplink transmissions (similar to the case of TDD networks).

The simplest CSI report is the Channel Quality Indication (CQI) which specifies the Modulation and Coding Scheme (MCS) for a target Block Error Rate (BLER) not higher than 10%, over different frequency regions of interest. Usually these CQI values are derived by terminals through appropriate link to system mapping models, that provide an equivalent (or effective) SINR under additive white Gaussian noise conditions leading to the same error rates. In what follows it is assumed that CQI indications are reported by the UES 202 and available at the network side for appropriate downlink scheduling.

Uplink scheduling is facilitated by direct channel sensing at the RUs, therefore no explicit feedback is required in this case. Present invention assumes that both downlink and uplink channel state information is available at the base station 201, and that CQI values will be available in both directions even if no actual CQI values will be reported for uplink scheduling. For simplicity, the temporal resolution will be one LTE subframe (1 ms) and the frequency resolution will be equal to a subband comprising a given number of LTE physical resource blocks (PRB). The subband size can be variable and dependent on a number of factors like system bandwidth and mode of operation.

Channel conditions are then stored by the network and, together with their past history, determine the scheduling metrics of the users at each of the resources to be shared.

Such metrics, when following a Proportional Fair criterion, are based on the ratio between the instantaneous throughput and the long-term average throughput, which are functions of the channel evolution and the traffic served for each of the users 202 and frequencies of interest.

The concept of serving cell in this invention is substituted by "serving RU", i.e. the RU in charge of the connection to/from a given user, where all the RUs logically belong to the same cell. The fundamental difference with respect to EP-A1-2676514 is that scheduling must be done for the whole set of RUs and users, and that CQIs are required not only for the serving RU but also for the set of RUs which are visible by a user (i.e. potentially causing or suffering interference). The RUs can then be considered simply as distributed antennas in a macro-cell scenario, and the CU must have knowledge of the channel response as experienced by the users. Hence the proposed method is devised such that users are able to estimate the downlink channel responses from each of the RUs by means of pilot or reference subcarriers inserted at known time-frequency locations. Estimation for a large number of RUs can rely on proper partitioning of the pilots so as to avoid collisions between them, as happens with the LTE Channel State Information Reference Signals (CSI-RS).

The CQI value for a given RU can be interpreted as the MCS format of a hypothetical transmission with a BLER not higher than 10%. When a given RU takes the role of a serving RU for a given user, then its corresponding CQI value (for a given frequency region) represents the most suitable MCS format to be employed in a transmission. All the other CQI values corresponding to non-serving RUs will carry an estimation of the interference level, rather than a desired signal's format.

As will be shown below, experiencing similar CQI values for both serving and non-serving RUs can lead to the application of CoMP techniques for interference reduction, while very different CQI values can lead to NOMA techniques. Sufficient RF isolation between RUs can only be identified when the presence of the interfering RU does not substantially change the perceived SINR (in the downlink), or when the received signal power at the interfered RU is below some threshold (in the uplink). In order to quantify these conditions, the lowest range of CQI values can be extended as in Table 1, which is constructed from the table specified in [3] after further expanding the lowest range from $CQI_{min}$ to 0. Other examples of extended CQI tables are equally possible depending on actual implementations.

TABLE 1 example of extended CQI formats and associated SINR values for LTE

| CQI index | modulation | code rate × 1024 | efficiency | effective SINR |
|---|---|---|---|---|
| $CQI_{min}$ | — | — | — | $SINR_1 - CQI_{min} - 1$ |
| ... | — | — | — | ... |
| -2 | — | — | — | $SINR_1 - 3$ |
| -1 | — | — | — | $SINR_1 - 2$ |
| 0 | — | — | — | $SINR_1 - 1$ |
| 1 | QPSK | 78 | 0.1523 | $SINR_1$ |
| 2 | QPSK | 120 | 0.2344 | — |
| 3 | QPSK | 193 | 0.3770 | — |
| 4 | QPSK | 308 | 0.6016 | — |
| 5 | QPSK | 449 | 0.8770 | — |
| 6 | QPSK | 602 | 1.1758 | — |
| 7 | 16QAM | 378 | 1.4766 | — |
| 8 | 16QAM | 490 | 1.9141 | — |
| 9 | 16QAM | 616 | 2.4063 | — |

TABLE 1-continued example of extended CQI formats and associated SINR values for LTE

| CQI index | modulation | code rate × 1024 | efficiency | effective SINR |
|---|---|---|---|---|
| 10 | 64QAM | 466 | 2.7305 | — |
| 11 | 64QAM | 567 | 3.3223 | — |
| 12 | 64QAM | 666 | 3.9023 | — |
| 13 | 64QAM | 772 | 4.5234 | — |
| 14 | 64QAM | 873 | 5.1152 | — |
| 15 | 64QAM | 948 | 5.5547 | — |

It has to be noted that the effective SINR associated with CQI values 1 to 15 is not specified as it depends on receiver implementation. However the table assumes that, whatever the effective SINR value for CQI 1 is, values of CQI below 1 correspond to effective SINR values that are 1, 2 . . . $CQI_{min} - 1$ dB below the SINR associated to CQI 1.

The effective SINR shown at the rightmost column of Table 1 represents the value that would lead to a BLER equal to 10% in Additive White Gaussian Noise (AWGN) channel for the given modulation and coding rate. Effective SINR values are usually calculated by the receiver with the aid of suitable Link to System mapping schemes, whereby the instantaneous SINR profile in the frequency domain is transformed into a single equivalent value of SINR that produces the same error rate in an AWGN channel. This mapping is implementation-dependent, therefore no a-priori values can be assumed for the different CQI values.

Values of CQI below 1 do not contain any suitable MCS format but rather represent progressively lower values of the effective SINR, as shown in the rightmost column. SINR1 denotes the effective SINR associated with CQI 1 (which is unknown to the transmitter) below which the extended CQI formats are characterized by SINR values progressively lower, in steps of 1 dB. These extended values do not have any associated modulation and code rate. The minimum value $CQI_{min}$ would lead to conditions of sufficient RF isolation, i.e. an interfering level that do not cause significant harm in signal reception.

Other criteria for the design of the extended CQI table are possible, provided that they suitably extend the lowest range of SINR values so as to decide whether CoMP, NOMA or sufficient RF isolation can be assumed.

According to EP-A1-2676514 the Proportional Fair scheduling metrics can be extended to a given RU i, user j and frequency subband k by the following expression:

$$T_{ijk} = \frac{\text{throughput at } RU\ i \text{ for user } j \text{ in subband } k}{\text{average past throughput of user } j} = \frac{R_{ijk}}{\langle R_j \rangle},$$

where $T_{ijk}$ denotes the scheduling metric, $R_{ijk}$ are the throughput values, and $\langle R_j \rangle$ is the average past throughput of user j. The throughput values will be obtained from the reported CQI values which will also be denoted as $CQI_{ijk}$.

The objective of the scheduling mechanism is to find the exact allocation of users, subbands and RUs for which $$\sum_{i,j,k} T_{ijk}$$

is maximized, subject to the restriction that each user can be scheduled a maximum of K subbands. Contrary to single-cell scheduling, more than one transmission can be allowed at the same time-frequency resources of different RUs whenever any of the conditions for applying CoMP, NOMA or RF isolation are fulfilled. So, given the complexity of the joint maximization problem present invention, as already said, proposes a sub-optimal approach that extends EP-A1-2676514 to the scenario under study.

The throughput values $R_{ijk}$ can be directly obtained from the CQI values reported by the users, as each CQI value corresponds to a particular block size with a given instantaneous throughput. The average past throughput $<R_j>$ can be obtained by applying an autoregressive filter or direct averaging of past throughput values.

Following EP-A1-2676514, a number N of active users are assumed to be scheduled over M RUs, with n subbands in the total system bandwidth, where K is denoted as the maximum number of subbands to be scheduled for a user at a given RU. Any user can be scheduled an arbitrary number of subbands from 0 to K in a given RU, and if several RUs are coordinated in COMP for a given user then the same number of subbands (up to K) must be scheduled in all of them. Resources at a given RU can be shared by using NOMA if the signal levels fulfill the appropriate conditions that will be stated below for two simultaneous users.

It is assumed that the maximum number of RUs that can be coordinated for a given user (i.e. the size of the cluster for COMP) is fixed and denoted by L. It will also be assumed that the actual RUs comprising the coordination cluster can dynamically change according to the users' positions, in such a way that each user can always benefit from the best possible set of coordinating RUs in each cluster. Dynamic clustering is very complex in distributed deployments, but centralized deployments can benefit from dynamic coordination in a much easier way. Dynamic clustering allows the network to coordinate different RUs for different users according to the users' location and mobility patterns.

The set of metrics can be graphically depicted as a three-dimensional metrics table with N×n×M entries, as shown in FIG. 3. For each RU l and subband k there will be an assigned user, denoted as j=user(i, k). If CoMP is applied then several RUs can in principle be involved in serving several users for a given subband, i.e. user(i, k) can contain as many users as RUs are coordinated.

Scheduling without Adjacency Requirements for the Subbands

In this case users can be scheduled up to K subbands per RU, with no restriction on whether the assigned subbands are adjacent or not (as happens in the downlink of LTE). In what follows and without loss of generality, downlink scheduling will be assumed for the case where adjacency of the subbands is not required, but its application to the uplink case will be straightforward to those skilled in the art.

If several RUs are coordinated through COMP for the transmissions towards a given user then the same set of subbands will be scheduled, including other users possibly involved in the coordination, thereby performing multi-user scheduling by a set of coordinated RUs.

User(i, 0), user(i, 1), . . . , user(i, n−1) are denoted as the set of users which will be assigned subbands 0, 1, . . . , n−1 at RU i. $S_i$ is denoted as the set of users that have already been scheduled a total of K subbands at RU i:

$$S_i = \{j \in [0, N-1] : j = \text{user}(i, k_0), \ldots, j = \text{user}(i, k_{K-1}) \text{ for } k_0, k_1, \ldots, k_{K-1} \in [0, n-1]\}$$

Initially the algorithm will set the values user(i, k)=−1 for all values of i and k, and $S_i = \{\emptyset\}$. For a given time instant (that should be a multiple of the transmission time interval, or TTI), a random subband k and RU i are selected among the set of subbands and RUs not yet assigned, then the algorithm proceeds as follows:

1. Find the user with the highest metric $T_{ijk}$ for RU i and subband k among the users not yet scheduled (i.e. not belonging to $S_i$):

$$j_0 = \underset{j \notin S_i}{\operatorname{argmax}} \{T_{ijk}\}.$$

If there are several maxima, the selected user $j_0$ is chosen randomly among the candidates.

2. For the same subband k, analyze whether there is another RU i' for which user $j_0$ has a higher maximum value of the metric $T_{ijk}$, i.e.:

$$\text{user}(i', k) = -1$$
$$T_{i'j_0k} > T_{ij_0k}$$
$$j_0 = \underset{j \notin S_{i'}}{\operatorname{argmax}} \{T_{i'jk}\}$$

In this case user $j_0$ is a better candidate for RU i' than for RU i. Otherwise RU i will remain as the best one for user $j_0$. The following steps will be carried out for the selected RU, be it i or i' (denoted as i for simplicity).

3. For the selected RU, check whether there is another user already scheduled in the same subband, thus giving rise to two possibilities:

In case there is another user $j_0$' already scheduled in the same subband as $j_0$, then this means that CoMP is employed in that subband. In this case user $j_0$ can be paired with user $j_0$' and user $j_0$ must employ the same subbands as $j_0$'. To check this:

Denoting $CQI_{ij}$ as the wideband CQI reported by user j for RU i, if $|CQI_{i'j_0} - CQI_{ij_0}| < \text{Threshold}_{CoMP}$ at the set of RUs i' being coordinated for user $j_0$', then user $j_0$ can be paired with user $j_0$' at the same RUs and subbands. If the necessary conditions for application of CoMP are met (after examination of the corresponding channel matrices and any other criteria), and if the number of already coordinated users is lower than L, then the same set of subbands scheduled for user j' will be automatically scheduled for user $j_0$ and the network will serve both users at the same RUs and subbands. The signals from the coordinated RUs will thus be reinforced, and CoMP will lead to boosting the user's throughput by a given factor that can reflect an average cell-edge throughput improvement compared to the single RU case.

Otherwise, user $j_0$ cannot be scheduled the same resources as user $j_0$' and all the metric values for user $j_0$ and the RUs involved in the coordination will be crossed out in the three-dimensional metrics table for the set of subbands scheduled for user $j_0$'. If the number of already coordinated users is equal to L then all metric values will be crossed out for all the remaining users at the same set of subbands and RUs involved in the coordination.

If there is no other user already scheduled in the same subband, check whether there is another subband l≠k for which user $j_0$ has a higher maximum value of the metric $T_{ijk}$, i.e. the following three conditions are met:

$$\text{user }(i, l) = -1$$

$$T_{ij_0 l} > T_{ij_0 k}$$

$$j_0 = \underset{j \notin S_i}{\operatorname{argmax}}\{T_{ijl}\} \qquad 5$$

In the affirmative case, and to elucidate whether user $j_0$ might be a better candidate for subband l than for subband k, suitable secondary maxima of the metric values are sought for both subbands, namely:

$$j_1 = \underset{j \notin S_i, j \neq j_0}{\operatorname{argmax}}\{T_{ijk}\}$$

$$j_2 = \underset{j \notin S_i, j \neq j_0}{\operatorname{argmax}}\{T_{ijl}\}$$

If $T_{ij_1 k} + T_{ij_0 l} > T_{ij_0 k} + T_{ij_2 l}$ then the algorithm assigns user $j_1$ to subband k and user $j_0$ to subband l: user(i,k)←$j_1$, user(i,l)←$j_0$. Otherwise the algorithm assigns user $j_0$ to subband k and user $j_2$ to subband l: user(i,k)←$j_0$, user(i,l)←$j_2$.

In the opposite case, i.e. if there is no other subband l in which the user $j_0$ has a higher maximum value of the metric $T_{ijk}$ for RU i, then the algorithm assigns user $j_0$ to subband k: user(i,k)←$j_0$.

The algorithm then checks whether the assigned subband(s) can also be scheduled at a different RU i' in CoMP, NOMA or RF isolation conditions:

Denoting $CQI_{ij}$ as the wideband CQI reported by user j for RU i, if $|CQI_{i'j} - CQI_{ij}| < \text{Threshold}_{CoMP}$ for a given RU i'≠i then significant interference will be experienced from RU i' by user j, and CoMP techniques may be applied for the minimization of interferences between RUs i and i'. If the necessary conditions are met for application of CoMP (after examination of the corresponding channel matrices and any other criteria), and if the number of already coordinated RUs for user j is lower than L, then the same user and subbands will be scheduled at RUs i and i' in a network-MIMO fashion. Subbands already scheduled for user j at RU i will then also be scheduled at RU i'. The signals from a number of RUs serving a given user at given subbands will thus be reinforced, and CoMP will lead to boosting the user's throughput by a given factor that can reflect an average cell-edge throughput improvement compared to the single RU case. The metric values $T_{ijk}$ for RUs i, i' and subbands k corresponding to users other than user j will not be crossed out in the matrix, to allow other users to be eventually scheduled the same resources by virtue of CoMP (up to the limit L). This condition will be checked at all possible RUs for user j so as to coordinate the highest possible number of RUs (up to the limit L).

If $\text{Threshold}_{RFisolation} < |CQI_{i'jk} - CQI_{ijk}| < \text{Threshold}_{NOMA}$ for a given RU i', and if there exists another user j' for which $\text{Threshold}_{RFisolation} < |CQI_{ij'k} - CQI_{i'j'k}| < \text{Threshold}_{NOMA}$, then NOMA can be applied for RUs i and i' and users j and j' at subband k. NOMA implies that a maximum of two users can share resources by exploiting the relative difference in their signal levels. The corresponding throughput values for both users can then be affected by an improvement factor that accounts for the interference cancellation procedure when calculating the overall sum-rate capacity. Any other entries in the three-dimensional table corresponding to RUs i and i' will be crossed out for subband k and users other than j and j', to reflect the limitation in the maximum number of two users in NOMA.

It is important to note that NOMA relies upon proper power control strategies in order to maximize capacity [2]. Power control in NOMA can however be rather complex in single-cell scenarios, and nearly intractable in multi-cell centralized deployments where any variations in the transmit power of an RU can impact the reported CQI values in an unpredictable way. Therefore present invention assumes that transmit power at the RUs is unchanged for application of NOMA.

If $|CQI_{i'jk} - CQI_{ijk}| < \text{Threshold}_{RFisolation}$ for a given RU i and subband k, then RUs i and i' will be considered sufficiently isolated for user j, and subband k can be reused for those RUs.

After checking the above three points, the algorithm will cross out any entries in the three-dimensional table corresponding to RUs for which the above three conditions are not met at the assigned subband k for user j. This means that actual transmissions from interfering RUs will be muted for all users j at resources where interference is significant and cannot be mitigated, this condition being denoted as "resource blanking". No interference will thus be suffered from those RUs in the cases where no CoMP, NOMA or sufficient RF isolation can be present.

4. In case any user has already been scheduled the maximum number of subbands K for a given RU i, the corresponding values $T_{ijk}$ will be crossed out for RU i and user j, ∀k to reflect that no more subbands can be scheduled to that user. Such user will be added to the set $S_i = S_i \cup \{j\}$. If the user is in CoMP, all other users simultaneously scheduled by the involved RUs will also be included in the set (as they share the same subbands), and the corresponding values $T_{ijk}$ be crossed out ∀k.

5. The procedure is repeated by selecting a new random subband and RU until there are no subbands left unassigned in any of the RUs. The three-dimensional metrics table will be updated with the values corresponding to the next time instant, setting $CQI_{ijk}$ values to minus infinity for all users at those RUs and subbands where resource blanking was applied.

Randomness in the selection of subbands and RUs should ensure that the scheduling decisions have no bias towards certain RUs, subbands or users. At the end of the algorithm there can be users with K (non-adjacent) scheduled subbands at a given RU, users with less than K subbands, and users with no subbands at all. In addition, some users will be connected to a single RU, others will be served by multiple RUs in CoMP, and others will share resources by virtue of NOMA. Resources will also be shared by users sufficiently isolated from one another at specific subbands, and finally some resources can be blanked to avoid strong interference.

The parameters $\text{Threshold}_{CoMP}$, $\text{Threshold}_{RFisolation}$ and $\text{Threshold}_{NOMA}$ denote suitable thresholds that can be a-priori configured.

The proposed algorithm has enough flexibility to allocate resources by making use of CoMP, NOMA, resource blanking, and RF isolation. However application of CoMP and NOMA does require the fulfillment of a number of conditions for the signals and channel matrices that must be incorporated to the scheduling decisions. The proposed thresholds for application of CoMP and NOMA represent suitable starting points for the decisions, but further considerations will be taken in practical implementations to ensure whether CoMP and NOMA can be applied or not on a case-by-case basis.

The proposed method can also be applied in system-level simulations and planning tools in order to estimate the capacity of a given deployment. After application of the proposed method to the overall set of users, RUs and subbands, the sum-rate capacity can be computed by summing all the throughput values, with the following considerations:

- Users in CoMP will be computed by applying an improvement factor over the throughput obtained if a single RU was used, which in turn corresponds to the highest throughput value among the different coordinated RUs (that would correspond to the "serving RU"). The improvement factor thus applied over such "serving RU" accounts for the beneficial effects of CoMP. Throughput values of the user at RUs other than the "serving RU" will not be accounted for, as their effects will be globally considered in the overall improvement factor.
- Users in NOMA will be computed independently by increasing their throughput values by another improvement factor that accounts for the interference cancellation benefits at the receiver. A maximum of two users can be in NOMA conditions for a given subband and pair of RUs.
- When resources are blanked at specific RUs and subbands to avoid strong interference, there will be an overall improvement in the throughput experienced by users that would otherwise be potential victims of such RUs. This effect however is taken into account implicitly as the CQI reports from the users will reflect the better interference conditions after blanking some resources at potentially interfering RUs.

It is to note that the above improvement factors are only simplifications for quick calculation of the sum-rate capacity, however a more exact calculation would require a deeper analysis of the involved signals and interference levels so as to subtract specific interference terms (in NOMA) or evaluate the gains obtained (in CoMP).

Average past throughput values must also be updated, along with the metrics table, after application of the proposed scheduling in a given TTI. Throughput values should be increased by the real improvements brought by application of CoMP or NOMA when appropriate. However this depends on implementation issues like effectiveness of the interference cancellation at the receiver, MIMO characteristics of the channel, etc. and can be very difficult to account for in centralized scheduling decisions. Therefore, in present invention the average throughput values will be calculated taking into account the simplified throughput improvement factors in CoMP and NOMA, rather than the real throughput experienced by the users. This strategy can bias scheduling decisions for some users, but makes it independent of the actual detection performance.

The complexity of the procedure grows linearly with the number of RUs, subbands and users, i.e. it is $O(M \cdot N \cdot n)$.

Scheduling with Adjacency Requirements for the Subbands

For those cases where the scheduled subbands for each user must be adjacent (like e.g. in LTE uplink), the above described algorithm has to be modified so as to impose the adjacency requirement. In what follows uplink direction will be assumed without loss of generality. In this case COMP techniques can involve Joint Reception (JR) to improve the signal quality by simultaneous detection of the signals at different RUs. NOMA can also be applied by exploiting the difference in the received signal levels for interference cancellation. In any case all the scheduled subbands must be adjacent (and not exceed the maximum number K per RU).

$S_i$ is denoted as the set of users that have already been scheduled a number of $K_0$ adjacent subbands at RU i, where $K_0 \le K$:

$$S_i = \{j \in [0, N-1] : j = \text{user}(i, k_0), \ldots, j = \text{user}(i, k_0 + K_0 - 1) \text{ for } K_0 \le K, k_0 \in [0, n-1]\}.$$

It is to note that, contrary to the case where adjacency of the subbands is not required, users belonging to $S_i$ may be scheduled less than K subbands. The reason is that the adjacency requirement may impose a limitation on the number of allocated subbands, as beyond a certain limit the sum of the metrics may not be maximized or the scheduling process may collide with other subbands already scheduled for a different user.

According to EP-A1-2676514 the following sum of the metrics at RU i and user j in a number $K_k$ of adjacent subbands is defined, starting from subband k:

$$\text{sum}^*(i, j, k, K_k) \equiv T_{ijk} + T_{ij,k+1} + \ldots + T_{ij,k+K_k-1}.$$

Initially the algorithm will set the values user(i, k)=−1 for all values of i and k, and $S_i = \{\emptyset\}$. For a given time instant (that should be a multiple of the transmission time interval, or TTI), a random subband k and RU i are selected among the set of subbands and RUs not yet assigned, then the algorithm proceeds as follows:

1. Find the user with the highest sum of adjacent metrics $T_{ijk}$, for RU i counting from subband k, among the users not yet scheduled (i.e. not belonging to $S_i$):

$$j_0 = \underset{j \notin S_i}{\text{argmax}} \{\text{sum}^*(i, j, k, K_k), \text{ for some } K_k \le K\}.$$

The quantity $K_k$ is such that the sum of the metrics is maximized taking care of not invading other already assigned subbands. If there are several maxima, the selected user $j_0$ is chosen randomly among the candidates.

2. For the same subband k, analyze whether there is another RU i' for which user $j_0$ has a higher maximum value of the sum of the metrics, i.e.:

$$\text{user}(i', k) = -1$$

$$\text{sum}^*(i', j_0, k, K'_k) > \text{sum}^*(i, j_0, k, K_k) \text{ for some } K'_k \le K$$

$$j_0 = \underset{j \notin S_{i'}}{\text{argmax}} \{\text{sum}^*(i', j, k, K'_k), \text{ for some } K'_k \le K\}$$

In this case user $j_0$ is a better candidate for RU i' than for RU i. Otherwise RU i will remain as the best one for user $j_0$. The following steps will be carried out for the selected RU, be it i or i' (denoted as i for simplicity).

3. For the selected RU, analyze whether there is another subband l≠k for which user $j_0$ has a higher maximum value of the sum of the metrics, i.e. the following three conditions are met:

user $(i, l) = -1$, user $(i, l+1) = -1, \ldots$, user $(i, l + K_l - 1) = -1$ for some $K_l \leq K$ $\text{sum}^*(i, j_0, l, K_l) > \text{sum}^*(i, j_0, k, K_k)$ $j_0 = \underset{j \notin S_i}{\text{argmax}}\{\text{sum}^*(i, j, l, K_l)\}$ In the affirmative case, and to elucidate whether user $j_0$ might be a better candidate for subbands l, l+1, ..., l+$K_l$−1 than for subbands k, k+1, ..., k+$K_k$−1, suitable secondary maxima of the sum of the metrics are sought for both sets of subbands, namely:

$j_1 = \underset{j \notin S_i, j \neq j_0}{\text{argmax}}\{\text{sum}^*(i, j, k, K_{k1}), \text{ for some } K_{k1} \leq K\}$ $j_2 = \underset{j \notin S_i, j \neq j_0}{\text{argmax}}\{\text{sum}^*(i, j, l, K_{l2}), \text{ for some } K_{l2} \leq K\}$ The previous metrics are compared by checking the following condition:

sum*$(i,j_1,k,K_{k1})$+sum*$(i,j_0,l,K_l)$>sum*$(i,j_0,k,K_k)$+sum*$(i,j_2,l,K_{l2})$ If the above equation is fulfilled then the algorithm assigns user $j_1$ to subbands k, k+1, ..., k+$K_{k1}$−1 and user $j_0$ to subbands l, l+1, ..., l+$K_l$−1:

user$(i,k) \leftarrow j_1$, user$(i,k+1) \leftarrow j_1$, ..., user$(i,k+K_{k1}-1) \leftarrow j_1$ user$(i,l) \leftarrow j_0$, user$(i,l+1) \leftarrow j_0$, ..., user$(i,l+K_l-1) \leftarrow j_0$.

Otherwise the algorithm assigns user $j_0$ to subbands k, k+1, ..., k+$K_k$−1 and user $j_2$ to subbands l, l+1, ..., $K_{l2}$−1:

user$(i,k) \leftarrow j_0$, user$(i,k+1) \leftarrow j_0$, ..., user$(i,k+K_k-1) \leftarrow j_0$ user$(i,l) \leftarrow j_2$, user$(i,l+1) \leftarrow j_2$, ..., user$(i,l+K_{l2}-1) \leftarrow j_2$.

In the opposite case, i.e. if there is no other subband l≠k in which the user $j_0$ has a higher maximum value of the sum of the metrics $T_{ijk}$, for that RU, then the algorithm assigns user $j_0$ to subbands k, k+1, ..., k+$K_k$−1:

user$(i,k) \leftarrow j_0$, user$(i,k+1) \leftarrow j_0$, ..., user$(i,k+K_k-1) \leftarrow j_0$.

The algorithm then checks whether the assigned subband(s) can also be scheduled at a different RU i' in CoMP, NOMA or RF isolation conditions:

Denoting $CQI_{ij}$ as the wideband CQI corresponding to user j for RU i, if $|CQI_{i'j}-CQI_{ij}|<\text{Threshold}_{CoMP}$ for a given RU i'≠i then detection can be improved by jointly receiving at RUs i and i'. If the necessary conditions for application of CoMP are met (after examination of the corresponding channel matrices and any other criteria), and if the number of already coordinated RUs for user j is lower than L, then the same user and subbands will be scheduled at RUs i and i' in a network-MIMO fashion. Subbands already scheduled for user j at RU i will then also be scheduled at RU i'. The signals received by a number of RUs from a given user at given subbands will thus be reinforced, and CoMP will lead to boosting the user's throughput by a given factor that can reflect an average cell-edge throughput improvement compared to the single RU case.

Contrary to the non-adjacent case, the metric values $T_{ijk}$ for RUs i, i' and subbands k corresponding to users other than j will be crossed out in the matrix, thus precluding multiple users being scheduled the same resources as this would require collaborative precoding (which is not possible).

This condition will be checked at all possible RUs for user j so as to coordinate the highest possible number of RUs (up to the limit L).

If $\text{Threshold}_{RFisolation}<|CQI_{i'jk}-CQI_{ijk}|<\text{Threshold}_{NOMA}$ for a given RU i', and if there exists another user j' for which $\text{Threshold}_{RFisolation}<|CQI_{ij'k}-CQI_{i'j'k}|<\text{Threshold}_{NOMA}$, then NOMA can be applied for RUs i and i' and users j and j' at the scheduled subbands k. NOMA implies that a maximum of two users can share resources by exploiting the relative difference in their signal levels. The corresponding throughput values for both users can then be affected by an improvement factor that accounts for the interference cancellation procedure when calculating the overall sum-rate capacity. Any other entries in the three-dimensional table corresponding to RUs i and i' will be crossed out for the assigned subbands and users other than j and j', to reflect the limitation in the maximum number of two users in NOMA. It is important to note that NOMA relies upon proper power control strategies in order to maximize capacity [2]. Power control in NOMA can however be rather complex in single-cell scenarios, and nearly intractable in multi-cell centralized deployments where any variations in the transmit power can impact the interference suffered by multiple RUs. Therefore in this invention it will be assumed that the devices' transmit powers are unchanged for application of NOMA.

If $|CQI_{i'jk}-CQI_{ijk}|<\text{Threshold}_{RFisolation}$ for a given RU i' and the assigned set of subbands k, then RUs i and i' will be considered sufficiently isolated for user j, and the assigned subbands can be reused for those RUs.

After checking the above three points, the algorithm will cross out any entries in the three-dimensional table corresponding to RUs for which the above three conditions are not met at the assigned subbands for user j. This means that actual transmissions from interfering users will be muted at resources where interference is significant and cannot be mitigated, this condition being denoted as "resource blanking". No interference will thus be suffered from those users in the cases where no CoMP, NOMA or sufficient RF isolation can be present.

4. In case any user has already been scheduled the maximum number of subbands K for a given RU i, the corresponding values $T_{ijk}$ will be crossed out for RU i and user j, ∀k to reflect that no more subbands can be scheduled to that user. Such user will be added to the set $S_i=S_i\cup\{j\}$. Furthermore, if a user cannot be scheduled any additional subband for a given RU even if less than K subbands are scheduled (e.g. because of an already scheduled adjacent resource), such user will also be added to the set $S_i$.

5. The procedure is repeated by selecting a new random subband and RU until there are no subbands left unassigned in any of the RUs. The three-dimensional metrics table will be updated with the values corresponding to the next time instant, setting $CQI_{ijk}$ values to minus infinity for all users at those RUs and subbands where resource blanking was applied.

Randomness in the selection of subbands and RUs should ensure that the scheduling decisions have no bias towards certain RUs, subbands or users. At the end of the algorithm there can be users with K (adjacent) scheduled subbands at a given RU, users with less than K subbands, and users with no subbands at all. In addition, some users will be connected to a single RU, others will be served by multiple RUs in CoMP, and others will share resources by virtue of NOMA. Resources will also be shared by users sufficiently isolated from one another at specific subbands, and finally some resources can be blanked to avoid strong interference.

The parameters $Threshold_{CoMP}$, $Threshold_{RFisolation}$ and $Threshold_{NOMA}$ denote suitable thresholds that can be a-priori configured, and may be equal or different than those in the non-adjacent case.

The same considerations regarding calculation of the sum-rate capacity of the RUs will be observed as in the non-adjacent case. Suitable improvement factors for CoMP and NOMA will also be taken into consideration when updating the average throughputs after application of the scheduling algorithm in one TTI, or when calculating the sum-rate capacity in system-level simulations.

The complexity of the procedure grows linearly with the number of RUs, subbands and users, i.e. it is O(M·N·n).

Figure 4:
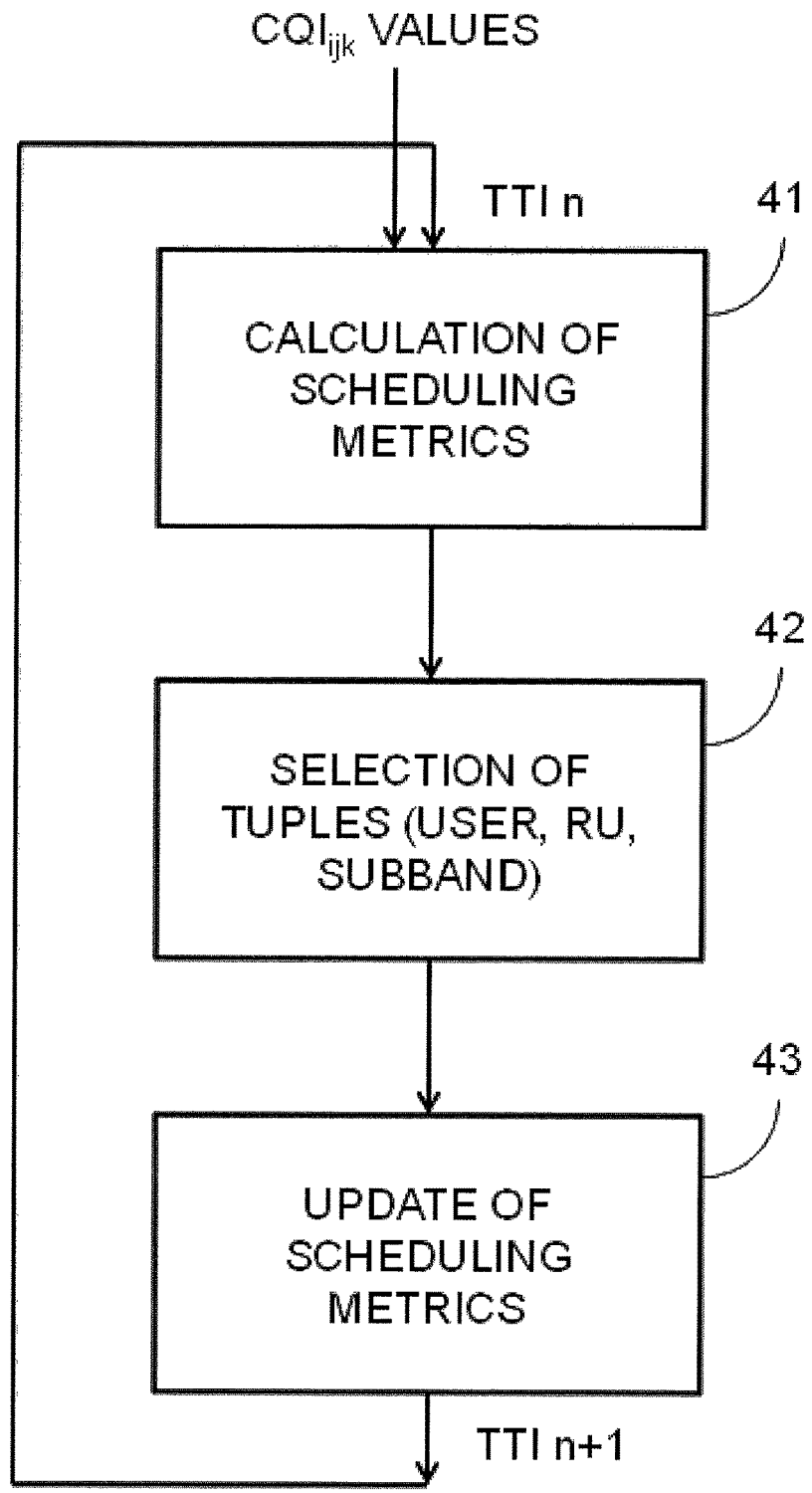
FIG. 4 is an exemplary embodiment for application of the proposed invention at a central unit.

With reference now to FIG. 4 therein it is illustrated an exemplary embodiment for the proposed invention running on a CU of a CRAN, comprising a number M of RUs and a number N of users. Suitable CQI values corresponding to each subband and RU are reported by the users on a periodical basis. The CQI values along with the average past throughput values allow the CU to obtain the scheduling metrics for each user at TTI n, subband and RU 41. The proposed scheduling algorithm is then executed, as a result of which suitable selection of 3-tuples (user, RU, subband) are generated 42. The scheduling metrics must then be updated 43, and the process is repeated for TTI n+1. CQI values may be similar or different to those in TTI n depending on the periodicity of the CQI reports. Allocation of resources according to the selected 3-tuples (user, RU, subband) will be performed in both uplink and downlink directions, taking into account whether adjacency requirements are to be fulfilled or not for the scheduled subbands.

The proposed invention may be implemented in hardware, software, firmware, or any combination thereof. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Any processor and the storage medium may reside in an ASIC. The ASIC may reside in a user terminal. In the alternative, the processor and the storage medium may reside as discrete components in a user terminal.

As used herein, computer program products comprising computer-readable media including all forms of computer-readable medium except, to the extent that such media is deemed to be non-statutory, transitory propagating signals.

The scope of the present invention is defined in the following set of claims.

The invention claimed is:

1. A method to perform joint scheduling in the downlink of a centralized OFDM radio access network for a plurality of users considering time, frequency and space domains, said scheduling being executed at a central unit, CU, of the centralized OFDM radio access network comprising a number M of remote units, RUs, and a number N of users, said CU having complete knowledge of channel quality characteristics at n different frequency subbands for said number N of users, wherein the scheduling being for a maximum of K subbands at arbitrary frequency locations for each remote unit, RU, of said number M of RU and wherein the scheduling exploiting Coordinated Multi Point, CoMP, Non-Orthogonal Multiple Access, NOMA, and Radio Frequency, RF, isolation conditions, and resource blanking techniques, characterized in that the method comprises the following steps:

a) initializing values user(i, k)=−1 for all values of i and k, and $S_i=\{\emptyset\}$, wherein user(i, 0), user(i, 1), . . . , user(i, n−1) denote the set of users which will be assigned subbands 0, 1, . . . , n−1 at RU i, and $S_i$ denotes the set of users that have already been scheduled a total of K subbands at RU i according to the expression:

$$S_i=\{j\in[0,N-1]; j=user(i,k_0), \ldots, j=user(i,k_{K-1}) \text{ for } k_0, k_1 \ldots, k_{K-1}\in[0,n-1]\};$$

b) calculating scheduling metrics $T_{ijk}$ corresponding to RU i, user j and subband k according to a given criterion, and constructing a three-dimensional metrics table of size N×n×M containing said scheduling metrics;

c) storing channel quality indicators, $CQI_{ijk}$, associated to RU i, user j and subband k, said channel quality indicators representing a measure of the channel quality as perceived by the users;

d) selecting, for each time instant, a random subband k and RU i among a set of subbands and RUs not yet assigned by the method;

e) finding a user $j_0$ with the highest metric $T_{ijk}$ for RU i and subband k among the users not belonging to $S_i$ according to the expression:

$$j_0 = \underset{j \notin S_i}{\operatorname{argmax}}\{T_{ijk}\},$$

wherein if several maxima are found, the user $j_0$ is chosen randomly among a number of users $j_0$ fulfilling said maxima;

f) analyzing whether there is another RU i' for which user $j_0$ has a higher maximum value of the metric $T_{ijk}$ for the same subband k, and in that case then considering RU i' rather than RU i for association with user $j_0$, otherwise considering RU i;

g) checking, for the selected RU i, whether there is another user $j_0'$ already scheduled in the same subband as $j_0$, and in the affirmative case:

g1) deciding whether CoMP can be employed in that subband, and if CoMP can be employed, and if the number of already coordinated users is lower than L, then automatically scheduling for user $j_0$ the same set of subbands scheduled for user $j_0'$, wherein L denotes the size of the CoMP cluster; or g2) crossing out all the metric values for user $j_0$ and the RUs involved in the coordination in the three-dimensional metrics table, for the set of subbands scheduled for user $j_0'$, and if the number of already coordinated users is equal to L then all metric values will be crossed out for all the remaining users at the same set of subbands and RUs involved in the coordination;

h) if there is no other user $j_0'$ already scheduled in the same subband as $j_0$ for the selected RU, analyzing whether there is another subband $l \neq k$ for which user $j_0$ has a higher maximum value of the metric $T_{ijk}$, and in the affirmative case, secondary maxima of the metric values are sought for both subbands, namely:

$$j_1 = \operatorname*{argmax}_{j \notin S_i, j \neq j_0}\{T_{ijk}\}$$

$$j_2 = \operatorname*{argmax}_{j \notin S_i, j \neq j_0}\{T_{ijl}\},$$

and if $T_{ij_1k} + T_{ij_0l} > T_{ij_0k} + T_{ij_2l}$ then assigning user $j_1$ to subband k and user $j_0$ to subband l, otherwise assigning user $j_0$ to subband k and user $j_2$ to subband l;

if there is no other subband $l \neq k$ for which user $j_0$ has a higher maximum value of the metric $T_{ijk}$, assigning user $j_0$ to subband k;

i) analyzing whether the assigned subband(s) can also be scheduled at a different RU i' in CoMP, NOMA or RF isolation conditions, by:

i1) deciding whether CoMP can be employed for a given RU $i' \neq i$, and in such a case and if the number of already coordinated RUs for user j is lower than L, then applying CoMP techniques so that the same user and subbands will be scheduled at RUs i and i';

i2) deciding whether NOMA can be employed for a given RU $i' \neq i$, and in such a case then applying NOMA for RUs i and i' and users j and j' at subband k, thereby sharing resources for both users at both RUs, and crossing out and any other entries in the three-dimensional table corresponding to RUs i and i' for subband k and users other than j and j';

i3) deciding whether there is sufficient RF isolation between RUs i and i' for subband k and a given RU i', and in such a case then RUs i and i' will be considered sufficiently isolated for user j, and subband k can be reused for those RUs; and i4) crossing out any entries in the three-dimensional metrics table corresponding to RUs for which the above three conditions (i1-i3) are not met at the assigned subband k for user j, thereby muting transmissions from interfering RUs for all users j at resources wherein interference is significant and cannot be mitigated;

j) checking whether any user has already been scheduled the maximum number of subbands K for a given RU i, and in such a case:

j1) crossing out the corresponding values $T_{ijk}$ in the three-dimensional metrics table for RU i and user $j \forall k$, j2) adding user j to the set $S_i = S_i \cup \{j\}$, and j3) if the user is in CoMP then all other users simultaneously scheduled by the involved RUs will also be included in the set, and the corresponding values $T_{ijk}$ be crossed out $\forall k$; and k) repeating steps d) to j) by selecting a new random subband and RU until there are no subbands left unassigned in any of the RUs, after updating the three-dimensional metrics table with the values corresponding to a next time instant and setting $CQI_{ijk}$ values to minus infinity for all users at those RUs and subbands wherein resource blanking was applied.

2. The method according to claim 1, wherein in step f) in order to analyze whether there is another RU i' for which said user $j_0$ has a higher maximum value of said metric $T_{ijk}$ for the same subband k, the method comprises checking if there exists an $i' \neq i$ that fulfills the following expressions:

$$\text{user } (i', k) = -1;$$

$$T_{i', j_0 k} > T_{ij_0 k}; \text{ and}$$

$$j_0 = \operatorname*{argmax}_{j \notin S_{i'}}\{T_{i'jk}\}.$$

3. The method according to claim 1, wherein in step g1) in order to analyze whether CoMP can be employed in a subband wherein there is another user $j_0'$ already scheduled in the same subband as said user $j_0$, the method comprises checking if $|CQI_{i'j0} - CQI_{ij0}| < \text{Threshold}_{CoMP}$ at the set of RUs i' being coordinated for user $j_0'$, wherein $CQI_{ij}$ is the wideband CQI for user j and RU i, and $\text{Threshold}_{CoMP}$ is a pre-configured parameter.

4. The method according to claim 1, wherein in step h) in order to analyze whether there is another subband $l \neq k$ for which said user $j_0$ has a higher maximum value of said metric $T_{ijk}$, the following conditions are checked:

$$\text{user } (i, l) = -1;$$

$$T_{ij_0 l} > T_{ij_0 k}; \text{ and}$$

$$j_0 = \operatorname*{argmax}_{j \notin S_i}\{T_{ijl}\}.$$

5. The method according to claim 1, wherein in step i1) in order to analyze whether CoMP can be employed at a different RU i' for said assigned subband(s), the method comprises checking if $|CQI_{i'j} - CQI_{ij}| < \text{Threshold}_{CoMP}$ for a given RU $i' \neq i$, wherein $CQI_{ij}$ denotes the wideband CQI for user j and RU i and $\text{Threshold}_{CoMP}$ is a pre-configured parameter.

6. The method according to claim 1, wherein in step i2) in order to analyze whether NOMA can be employed at a different RU $i' \neq i$ for said subband k, the method comprises checking if $\text{Threshold}_{RFisolation} < |CQI_{i'jk} - CQI_{ijk}| < \text{Threshold}_{NOMA}$ for a given RU i' and if there exists another user j' for which $\text{Threshold}_{RFisolation} < |CQI_{ij'k} - CQI_{i'j'k}| < \text{Threshold}_{NOMA}$, wherein $\text{Threshold}_{RFisolation}$ and $\text{Threshold}_{NOMA}$ are pre-configured parameters.

7. The method according to claim 1, wherein in step i3) in order to analyze whether there is sufficient RF isolation between RUs i and i' for said subband k the method comprises checking if $|CQI_{i'jk} - CQI_{ijk}| < \text{Threshold}_{RFisolation}$, wherein $\text{Threshold}_{RFisolation}$ is a pre-configured parameter.

8. A method to perform joint scheduling in the uplink of a centralized OFDM radio access network for a plurality of users considering time, frequency and space domains,
said scheduling being executed at a central unit, CU, of the centralized OFDM radio access network comprising a number M of remote units, RUs, and a number N of users, and said CU having complete knowledge of channel quality characteristics at n different frequency subbands for said number N of users, wherein the scheduling being for a maximum of K subbands at adjacent frequency locations for each remote unit, RU, of said number M of RUs, and wherein the scheduling exploiting Coordinated Multi Point, CoMP, Non-Orthogonal Multiple Access, NOMA, and Radio Frequency, RF, isolation conditions, and resource blanking techniques,
characterized in that the method comprises the following steps:
a) initializing values user(i, k)=−1 for all values of i and k, and $S_i=\{\emptyset\}$, wherein user(i, 0), user(i, 1), . . . , user(i, n−1) denote the set of users which will be assigned subbands 0, 1, . . . , n−1 at RU i, and $S_i$ denotes the set of users that have already been scheduled a total of $K_0$ subbands $S_i=\{j\in[0, N-1]: j=\text{user}(i,k_0), \ldots, j=\text{user}(i, k_0+K_0-1)$ for $K_0\le K$, $k_0\in[0, n-1]\}$ at RU i, wherein $K_0\le K$, according to the expression:
b) calculating scheduling metrics $T_{ijk}$ corresponding to RU i, user j and subband k according to a given criterion, and constructing a three-dimensional metrics table of size N×n×M containing said scheduling metrics;
c) storing channel quality indicators, $CQI_{ijk}$ associated to RU i, user j and subband k, said channel quality indicators representing a measure of the channel quality as perceived by the CU;
d) selecting, for each time instant, a random subband k and RU i among a set of subbands and RUs not yet assigned by the method;
e) finding a user $j_0$ with the highest sum of adjacent metrics $T_{ijk}$ for RU i counting from k, among the users not belonging to $S_i$, according to the expression:

$$j_0 = \underset{j\notin S_i}{\operatorname{argmax}}\{sum^*(i, j, k, K_k), \text{ for some } K_k \le K\},$$

wherein if several maxima are found, the user $j_0$ is chosen randomly among a number of users $j_0$ fulfilling said maxima, and sum*(i, j, k, $K_k$) represents the sum of the metrics at RU i and user j in a number $K_k$ of adjacent subbands starting from subband k:

sum*(i,j,k,$K_k$)≡$T_{ijk}$+$T_{ij,k+1}$+Λ+$T_{ij,k+K_k-1}$;

f) analyzing whether there is another RU i' for which user $j_0$ has a higher maximum value of the sum of the metrics, and in such a case then considering RU i' rather than RU i for user $j_0$, otherwise considering RU i;
g) analyzing, for the selected RU i, whether there is another subband l≠k for which user $j_0$ has a higher maximum value of the sum of the metrics, and
in the affirmative case then secondary maxima of the sum of the metrics are sought for both sets of subbands, namely:

$$j_1 = \underset{j\notin S_i, j\neq j_0}{\operatorname{argmax}}\{sum^*(i, j, k, K_{k1}), \text{ for some } K_{k1} \le K\}$$

$$j_2 = \underset{j\notin S_i, j\neq j_0}{\operatorname{argmax}}\{sum^*(i, j, l, K_{l2}), \text{ for some } K_{l2} \le K\},$$

and if the following condition is fulfilled:

sum*(i,$j_1$,k,$K_{k1}$)+sum*(i,$j_0$,l,$K_l$)>sum*(i,$j_0$,k,$K_k$)+sum*(i,$j_2$,l,$K_{l2}$)

then assigning user $j_1$ to subbands k, k+1, . . . , k+$K_{k1}$−1 and user $j_0$ to subbands l, l+1, . . . , l+$K_l$−1, otherwise assigning user $j_0$ to subbands k, k+1, . . . , k+$K_k$−1 and user $j_2$ to subbands l, l+1, . . . , l+$K_{l2}$−1;
if there is no other subband l≠k for which user $j_0$ has a higher maximum value of the sum of the metrics, assigning $j_0$ to subbands k, k+1, . . . , k+$K_k$−1;
h) analyzing whether the assigned subband(s) can also be scheduled at a different RU i'≠i in CoMP, NOMA or RF isolation conditions, by:
h1) deciding whether CoMP can be employed, and in such a case and if the number of already coordinated RUs for user j is lower than L then applying CoMP techniques and scheduling the same subbands at RUs i and i', and crossing out the metric values $T_{ijk}$ for RUs i, i' and subbands k corresponding to users other than j;
h2) deciding whether NOMA can be employed for a given RU i'≠i, and in such a case then applying NOMA for RUs i and i' and users j and j' at the scheduled subbands, thereby sharing resources for both users at both RUs, and crossing out and any other entries in the three-dimensional table corresponding to RUs i and i' for the assigned subbands and for users other than j and j';
h3) deciding whether there is sufficient RF isolation between RUs i and i' for a given RU i' and the assigned set of subbands, and in such a case then RUs i and i' will be considered sufficiently isolated for user j, and the assigned subbands can be reused for those RUs; and
h4) crossing out any entries in the three-dimensional metrics table corresponding to RUs for which the above three conditions (h1-h3) are not met at the assigned subbands for user j, thereby muting transmissions from interfering RUs for all users j at resources wherein interference is significant and cannot be mitigated;
i) checking whether any user has already been scheduled the maximum number of subbands K for a given RU i, or if no more subbands can be scheduled to a given user in RU i, and in such a case:
i1) crossing out the corresponding values $T_{ijk}$ in the three-dimensional metrics table for RU i and user j∀k, and
i2) adding user j to the set $S_i=S_i\cup\{j\}$; and
j) repeating steps d) to i) by selecting a new random subband and RU until there are no subbands left unassigned in any of the RUs, after updating the three-dimensional metrics table with the values corresponding to a next time instant and setting $CQI_{ijk}$ values to minus infinity for all users at those RUs and subbands wherein resource blanking was applied.

9. The method according to claim 8, wherein in step f) in order to analyze whether there is another RU i' for which said user $j_0$ has a higher maximum value of said sum of the metrics, the method checks the following expressions:

user $(i', k) = -1$;

$sum^*(i', j_0, k, K'_k) > sum^*(i, j_0, k, K_k)$ for some $K'_k \leq K$; and $j_0 = \underset{j \notin S_{i'}}{\operatorname{argmax}} \{sum^*(i', j, k, K'_k),$ for some $K'_k \leq K\}$.

10. The method according to claim 8, wherein in step g) in order to analyze whether there is another subband $l \neq k$ for which said user $j_0$ has a higher maximum value of said sum of the metrics, the method comprises checking the following conditions:

user $(i, l) = -1$, user $(i, l+1) = -1, \ldots$ , user $(i, l + K_l - 1) = -1$ for some $K_l \leq K$;

$sum^*(i, j_0, l, K_l) > sum^*(i, j_0, k, K_k)$; and $j_0 = \underset{j \notin S_i}{\operatorname{argmax}} \{sum^*(i, j, l, K_l)\}$.

11. The method according to claim 8, wherein in step h1) in order to analyze whether CoMP can be employed at a different RU i' for said assigned subbands, the method comprises checking if $|CQI_{i'j} - CQI_{ij}| < \text{Threshold}_{CoMP}$ for a given RU i'≠i, wherein $CQI_{ij}$ denotes the wideband CQI for user j and RU i and $\text{Threshold}_{CoMP}$ is a pre-configured parameter.

12. The method according to claim 8, wherein in step h2) in order to analyze whether NOMA can be employed at a different RU for said assigned subbands, the method comprises checking if $\text{Threshold}_{RFisolation} < -|CQI_{i'jk} - CQI_{ijk}| < \text{Threshold}_{NOMA}$ for a given RU i'≠i and if there exists another user j' for which $\text{Threshold}_{RFisolation} < |CQI_{ij'k} - CQI_{i'j'k}| < \text{Threshold}_{NOMA}$, wherein $\text{Threshold}_{RFisolation}$ and $\text{Threshold}_{NOMA}$ are pre-configured parameters.

13. The method according to claim 8, wherein in step h3) in order to analyze whether there is sufficient RF isolation between RUs i and i' for a given RU i'≠i and the assigned set of subbands, the method comprises checking if $|CQI_{i'jk} - CQI_{ijk}| < \text{Threshold}_{RFisolation}$ wherein $\text{Threshold}_{RFisolation}$ is a pre-configured parameter.

14. The method according to claim 1, wherein the scheduling metrics for RU i, user j and subband k are derived according to a Proportional Fair criterion by means of the expression:

$$T_{ijk} = \frac{\text{throughput at } RU\ i \text{ for user } j \text{ in subband } k}{\text{average past throughput of user } j} = \frac{R_{ijk}}{\langle R_j \rangle},$$

where: $T_{ijk}$ are the scheduling metrics, $R_{ijk}$ are the throughput values, and $\langle R_j \rangle$ is the average past throughput of user j.

15. The method according to claim 1, comprising employing NOMA techniques with a constant transmit power at the involved RUs or users and/or with a variable transmit power according to a power control strategy devised to maximize capacity.

16. The method according to claim 1, comprising calculating a sum-rate capacity of the number M of RUs by summing all the throughput values of the users, after applying an improvement factor to the users in CoMP with respect to the throughput obtained without CoMP if a single serving RU was used and not considering RUs other than said single serving RU, said improvement factor accounting for the a-priori beneficial effects of CoMP.

17. The method according to claim 1, comprising calculating a sum-rate capacity of the number M of RUs by summing all the throughput values of the users, after applying an improvement factor to the users in NOMA that accounts for the interference cancellation benefits at a receiver.

18. A method according to claim 1, wherein:
the channel quality in downlink direction is reported by the users by means of channel quality indicators, and is estimated by the CU in uplink direction, in Frequency Division Duplex, FDD, mode; or
the channel quality in downlink and uplink directions is estimated by the CU, in Time Division Duplex, TDD, mode.

19. A method according to claim 1, wherein the set of CQI values is extended to incorporate additional values with associated effective signal to interference and noise ratios which are lower than the one corresponding to the smallest coding rate allowable in the number M of RUs, said extended CQI values characterizing varying amounts of interference in order to evaluate the application of NOMA and RF isolation techniques.

20. A scheduler device to perform joint scheduling in centralized OFDM radio access networks for a plurality of users considering time, frequency and space domains, said scheduler device comprising one or more processors and at least one memory for performing the method steps according to claim 1.

21. A non-transitory computer-readable medium storing one or more instructions that, when executed by at least one or more processors of a computer system, causes the one or more processors to perform the method steps according to claim 1.

\* \* \* \* \*